March 27, 1928.                                              1,664,150
                          C. E. AUGNER
          DOUBLE ACTING FOUR-CYCLE INTERNAL COMBUSTION ENGINE
                    Filed May 10, 1926        2 Sheets-Sheet 1

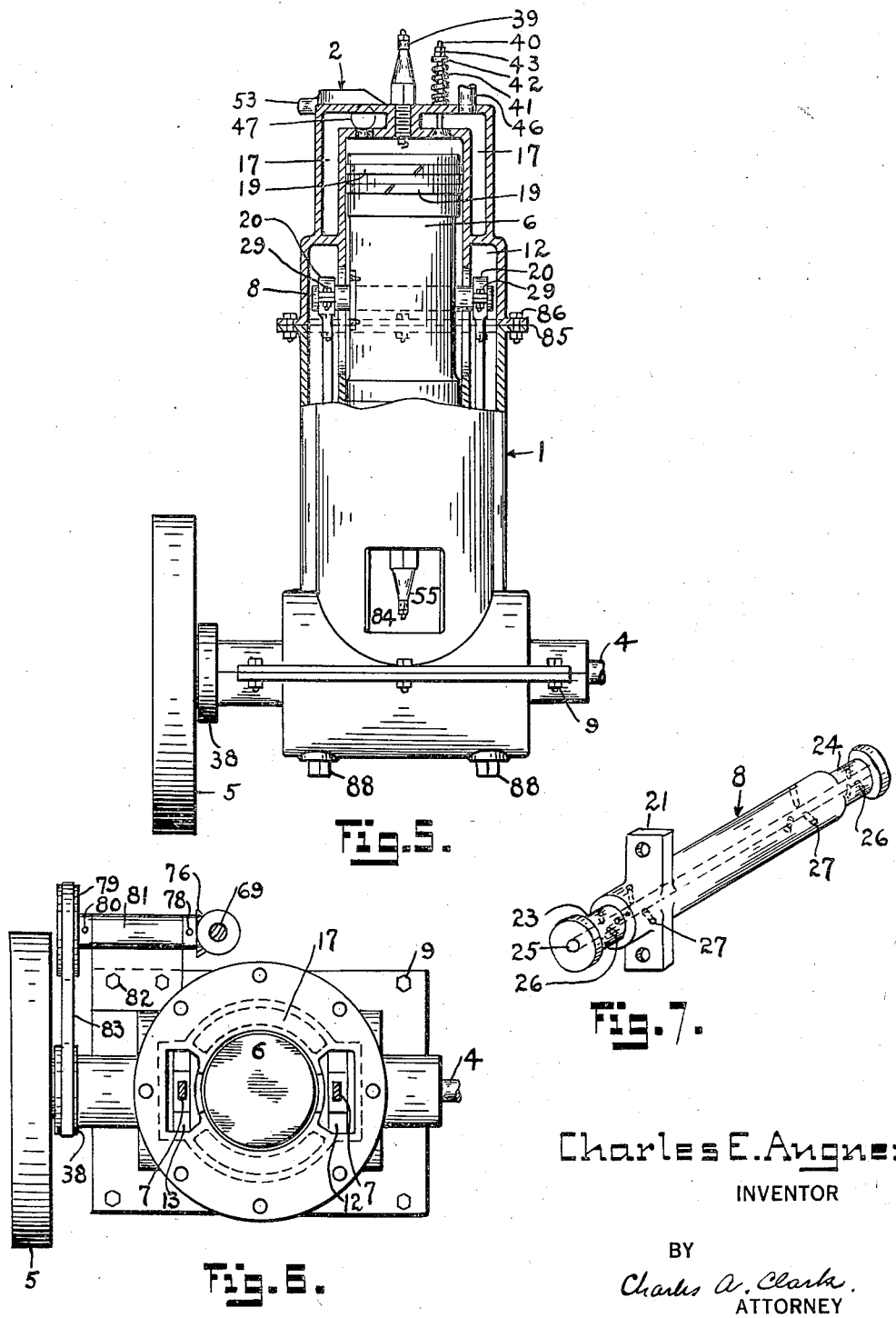

Patented Mar. 27, 1928.

1,664,150

UNITED STATES PATENT OFFICE.

CHARLES E. AUGNER, OF FLORAL PARK, NEW YORK.

DOUBLE-ACTING FOUR-CYCLE INTERNAL-COMBUSTION ENGINE.

Application filed May 10, 1926. Serial No. 108,051.

My invention relates to double acting internal combustion engines and is confined to engines of the four cycle type.

One object of my invention is to provide an engine that has a relatively small number of moving parts with the object in view of reducing the friction therein.

Another object of my invention is to develop a greater horsepower by utilizing the double acting effect of a combustion chamber at both ends of the cylinder.

A further object of my invention is to construct an engine that is compact, cheap to build and so designed that all the moving parts are perfectly lubricated.

A still further object of my invention is to distribute the strains on the wrist pin and crank shaft over a greater bearing surface.

It is well known that engines have been made employing two connecting rods for one piston but none contemplate the unique combination of novel elements utilized in producing the remarkable results obtained by this particular device.

With these and other objects in view. my invention consists of the novel construction, arrangements and formation of parts, hereinafter referred to and specifically described, claimed and illustrated in the accompanying drawings, wherein similar numerals refer to like parts throughout the several views, in which:—

Figure 1, is a vertical section of the engine taken longitudinally of the crank shaft.

Figure 2, is a vertical section taken transversely of the crank shaft.

Figure 3, is a cross section on line 3—3 of Figure 1.

Figure 4, is a cross section taken on line 4—4 of Figure 1.

Figure 5, is a partial section and elevation illustrating an alternative form wherein the cylinder is split at the central portion.

Figure 6, is a plan of Figure 5, with the upper portion removed.

Figure 7, is an isometric view of the wrist pin.

The engine as illustrated in Figures 1, 2, 3 and 4 is comprised of a cylinder 1, a cap 2, a lower casing 3, a crank shaft 4, fly wheel 5, piston 6, connecting rods 7, and wrist pin 8.

The cylinder 1, connected to the lower casing 3, by the bolts 9, and to the cap 2, by the bolts 10, has two parallel oppositely arranged slots 11, which communicate with two adjacent connecting rod pockets 12 and 13, extending to the lower crank case, each of said pockets provided with caps 14 and 15, removably held thereon by the bolts 16 and this cylinder also is provided with water cooling spaces 17.

The piston 6, with piston rings 19, at each end, has a centrally located wrist pin 8, the ends of which, passing through the slots 11, projecting into the pockets 12 and 13, which pin is rigidly held to the piston by the screws 20, in the flanged portion of the wrist pin at 21, which flanged portion is set into the piston at 22.

This wrist pin 8, with its flanged part 21, has recessed bearings 23 and 24 on each end, an oil hole 25, passing longitudinally throughout with several right angle oil hole 26 and 27 communicating with the bearings and the interior of the cylinder and is made up of one piece.

The bearings 23 and 24, of the wrist pin 8, each carry a connecting rod 7, provided with a cap 28, held in position by the screws 29.

The lower end of each connecting rod 7, is connected to the cranks 30 and 31, and held thereto by the caps 32 and the bolts 33.

The crank shaft 4, with the cranks 30 and 31, running in bearings 34, 35 and 36, with the flywheel 5, held thereon by the key 37, is provided with a wheel 38, rigidly attached to the crank shaft.

The cap 2, has a spark plug 39, centrally located therein, an inlet valve 40, controlled by the spring 41, washer 42 and nuts 43.

This valve 40, communicates with the combustion chamber 44, mixing chamber 45 and is supplied with vapor by the pipe 46.

The exhaust valve 47, shown in Figures 1 and 2, controlled by the spring 48, washers 49, and nuts 50, communicates with the combustion chamber 44, through the chamber 51, provided with opening 52, which chamber has an outlet 53.

The arrangement of this exhaust chamber is similar to that shown in Figure 4, for the lower chamber hereinafter described.

The lower part of the cylinder 1, also has a combustion chamber 54, and a spark plug 55.

The inlet valve 56, controlled by the spring 57, washer 58 and nuts 59, communicates with the combustion chamber 54, through the chamber 55, and hole 88, also communicates with the supply pipe 87.

The exhaust valve 58, controlled by the spring 59, washer 60, and nuts 61, communicates with the combustion chamber 54, through the chamber 62 and hole 63, also communicates with the outlet pipe 64.

The exhaust valves 58 and 47 are controlled by the cams 65 and 66, pinned to the shaft 69, by the pins 67 and 68.

This shaft 69, is carried by the upper bearing 70, held to the cylinder 1, by the bolts 71 and the lower bearing 72 is held by the bolts 73.

On the lower end of this shaft 69, is a gear 74, pinned thereto by the pin 75.

This gear 74, meshes with the gear 76, pinned on shaft 77 by the pin 78 and on the other end of this shaft is a wheel 79, pinned thereto by the pin 80, said shaft with its parts being carried by the bearing 81, held to the cylinder 1, by the bolts 82.

The crank shaft 4, drives the wheel 38, belt 83, wheel 79, shaft 77, gears 76 and 74, shaft 69 and the cams 65 and 66, which cams operate the exhaust valves.

To enable the removal of the spark plug 55, there is an opening 84, which extends through the cylinder 1, under the lower end.

Figures 5 and 6, illustrate an engine of similar character as shown in the other figures except that the cap is split at 85, at a point opposite the central portion of the slots 11, and is held in position by the bolts 86.

The lower case 3, is provided with an oil space or reservoir 87, and oil plugs 88 and the oil supply may fill this chamber and the greater part of the chambers 12 and 13, on the opposite sides of the cylinder 1.

The arrangement of the crank case, the shaft pockets and the centrally arranged slots communicating with the interior of the cylinder permits the oil in the crank case and shaft pockets to be pumped throughout the moving parts of the engine.

Having thus described and illustrated the preferred embodiment of my invention, I do not wish to limit myself to the exact construction shown, since it is evident that modifications may be made without departing from the spirit of the invention or scope of the claim.

I claim:—

In an internal combustion engine, a water cooled cylinder having oppositely arranged closed crank shaft pockets communicating with the interior of said cylinder at the central portion thereof, a double headed centrally recessed piston having piston rings at the extreme ends, having a centrally located flanged wrist pin as an integral part of said piston provided with means for oiling the bearings and cylinder, said pin having recessed bearings on the opposite ends thereof, connecting rods detachably and oscillatively held to said wrist pin and a double crank shaft, means supplying a gaseous mixture alternately to each combustion chamber, means alternately firing said mixture, means alternately exhausting the burnt gases from said combustion chambers and oiling means directed to force oil throughout the crank case, shaft pockets and to the interior of the cylinder.

Signed at New York city, in the county of New York and State of New York, this 8th day of May, A. D. 1926.

CHARLES E. AUGNER.